United States Patent [19]

Undin et al.

[11] Patent Number: 4,478,110

[45] Date of Patent: Oct. 23, 1984

[54] INSULATION STRIPPING APPARATUS

[75] Inventors: Hans Undin, Åkersberga; Hans Wiener, Täby, both of Sweden

[73] Assignee: C. A. Weidmüller GmbH & Co., Detmold, Fed. Rep. of Germany

[21] Appl. No.: 446,205

[22] Filed: Dec. 2, 1982

[30] Foreign Application Priority Data

Dec. 14, 1981 [DE] Fed. Rep. of Germany ....... 3149426

[51] Int. Cl.³ .............................................. H02G 1/12
[52] U.S. Cl. ..................................................... 81/9.51
[58] Field of Search .......................................... 81/9.51

[56] References Cited

U.S. PATENT DOCUMENTS

| 3,241,407 | 3/1966 | Oehlerking | 81/9.51 |
| 3,387,514 | 6/1968 | Carpenter | 81/9.51 |
| 3,537,339 | 11/1970 | Carpenter | 81/9.51 |
| 3,630,105 | 12/1971 | Rider | 81/9.51 |
| 3,892,145 | 7/1975 | Richie | 81/9.51 |
| 4,019,409 | 4/1977 | McKeever | 81/9.51 |
| 4,327,609 | 5/1982 | Resch | 81/9.51 |

Primary Examiner—James G. Smith
Attorney, Agent, or Firm—Toren, McGeady and Stanger

[57] ABSTRACT

Apparatus for stripping insulation from electrical conductors which have a circular cross-section includes a stationary stand on which a circular base plate is rotatably mounted. An elongated support unit for the conductor to be stripped is secured to and extends outwardly from the base plate. One or more insulation cutting knives are slidably or pivotally mounted on a mounting member which rotates together with the circular base plate. The number of knives depends on the type of conductor being stripped. Each knife is provided with an actuating device. The actuating device may be stationary or it may rotate at a rate slower than the rate at which the circular base plate rotates so that the associated knife gradually penetrates into and cuts the insulation layer on the conductor so that it can be stripped.

17 Claims, 11 Drawing Figures ns apparatus shown in FIG. 1;

FIG. 3 is a front view, similar to FIG. 1, of a second embodiment of the apparatus incorporating the present invention;

INSULATION STRIPPING APPARATUS

SUMMARY OF THE INVENTION

The present invention is directed to a device or apparatus for stripping the insulation layer from electrical conductors having a circular cross-section. The apparatus includes a support member for the conductor to be stripped and at least one insulation cutting knife having an operative portion of its cutting edge arranged to effect a severing cut along the entire circumferential periphery of the insulation layer of a conductor positioned on the support member. A device of this general type is disclosed in German Offenlegungsschrift No. DE-A-27 247 14.

It is the primary object of the present invention to provide a device of the type described above so that it is capable of severing without effort, and also under conditions of series production, even relatively thick insulation layers, such as in coaxial cables, where two or three insulation cutting knives are used with one of the knives penetrating the full thickness of an outer insulation layer, an outer conductive layer, and an inner insulation layer which in total may amount to an incision up to 5 mm deep.

In accordance with the present invention, a stripping apparatus of the general type described above includes a stationary stand on which a rotor member is rotatably mounted. The rotor member includes the conductor support member and a knife mounting unit on which all of the insulation cutting knives can be movably supported. On a carrier member which does not take part in the rotational motion, of the rotor member or takes part only partially in such rotational motion an actuating means is provided for each knife and in operation engages an engagement means connected to the cutting edge of the knife.

A significant feature of the invention is that the actuating means does not take part in the rotational motion of the knife mounting means or does not fully engage in such rotational motion, and at the same time contacts the engagement means. As a result, each insulation cutting knife is gradually pressed into the insulation layer at a selected rate, that is, during one or more turns of the rotor member, depending on the shape of the actuating means or on the relative reduction of the rotational motion of the actuating means relative to that of the rotor member.

The various members of novelty which characterize the invention are pointed out with particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

DETAIL DESCRIPTION OF THE INVENTION

Figure 1:
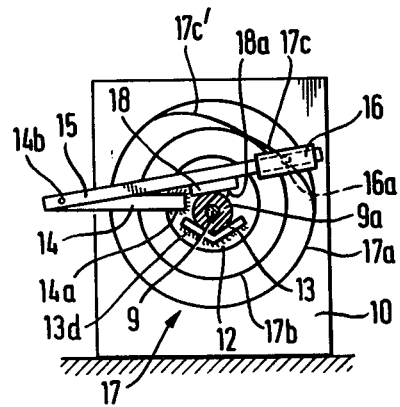
FIG. 1 is a front view of a first embodiment of the apparatus incorporating the present invention.

Similar or analogous reference characters are used to refer to similar parts in the different figures of the drawing.

Figure 2:
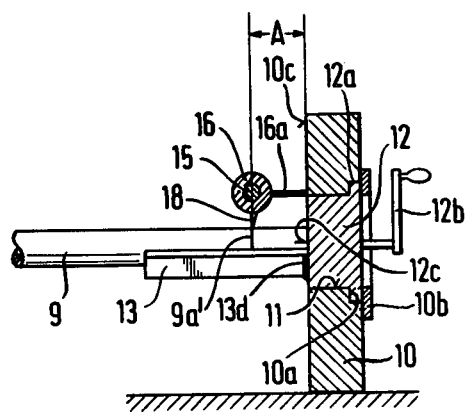
FIG. 2 is a longitudinal sectional view of the apparatus shown in FIG. 1.

In FIGS. 1 and 2 an upright stationary stand has a circular opening 11 in which a circular base plate 12 is rotatably mounted and forms a rotor member. As viewed in FIG. 2, the base plate has a left-hand or front side and a right-hand or rear side. At its rear side, the base plate 12 has a flange-like marginal lip 12a positioned in a corresponding circular recess 10a in the stand 10. The base plate is arranged to rotate about an axis passing perpendicularly of the front and rear sides. The base plate 12 is axially retained in position by securing a ring-shaped flange 10b to the stand 10 by means of screws or by bonding. The flange 10b extends inwardly over the marginal lip 12a securing the base plate 12 within the circular opening 11 in the stand 10. A manually operated crank handle 12b is secured to the rear side of the base plate 12 and forms a driving means for the rotor member.

On the front side of the base plate 12 an elongated support member 13 extends outwardly from the base plate in the axial direction thereof. As can be seen in FIG. 1, the support member 13 transverse to the axial direction forms a V-shaped trough. The support member 13 is fixed to the base plate 12, such as by welding at 13d. The trough-shaped support member 13 is located concentrically on the base plate 12, or to be more specific, it is positioned relative to the axis of the base plate 12 so that a conductor 9 supported on it is in substantially axial alignment with the axis of the base plate so that the conductor is arranged concentrically of the base plate axis. It should be noted, however, that strict concentricity of the conductor to be stripped with the axis of the rotor is not an absolute necessity, and slight differences from the concentric arrangement due to the conductors having slightly different diameters are generally irrelevant. Basically, the support member 13 is mounted on the central region of the base plate 12. Adjacent the support member 13, the first end of an extension arm 14 is secured so that it projects outwardly from the base plate 12. The arm 14 can be fixed to the base plate 12 such as by welding, note the weldment 14a. Base plate 12 along with its rigidly attached extension arm 14 defines the rotor member. At its other or second end 14b, the arm 14 has a pivot tap 14b for pivotally mounting a guiding arm 15 on which a sleeve 16 is slidably mounted. As can be seen in FIG. 2, the guiding arm 15 and the sleeve 16 extend generally parallel to the front side of the base plate 12 and the center of the sleeve is located a selected distance A from a reference place defined by the front side or face of the base plate 12. Distance A corresponds to the desired length of the severed end portion of the insulation layer of the conductor positioned on the support member 13. The necessary spacing of the sleeve 16 from the base plate is achieved by the pivot member 14b located at the second end of the arm 14 and having an appropriate length and/or by any of the arms 14, 15 being offset bent twice between its end parts. A sensor pin 16a and insulation cutting means 18 are fixed to the sleeve 16. Insulation cutting means 18 are formed by an elongated knife having an operative knife edge portion 18a located directly above the support member 13. Arms 14 and 15 along with the sleeve 16 define a knife mounting means.

A system 17 of recessed guiding grooves for the sensor pin 16a are formed in the front face 10c of the stand 10 extending around and spaced outwardly from the circular opening 11 containing the base plate 12. System 17 includes an outer circular groove 17a, an inner circular groove 17b both generally concentric to the opening 11, and a connecting groove 17c extending between and interconnecting the two circular grooves. The connecting groove 17c has a selected slope between the other two grooves for carrying out the cutting operation. Guiding groove system 17 defines an actuating means for the knife 18a, said front side or face 10c defines a carrier means for the actuating means, and sensor pin 16a defines an engagement means extending between the sleeve 16 and the grooves. The length of the sensor pin 16a in the axial direction of the base plate 12 corresponds to the distance A, reduced by the radius of the sleeve 16 and increased by the depth of the grooves 17a to 17c, so that the tip of the sensor pin 16a is normally always engaged with the base of the grooves.

The apparatus illustrated in FIGS. 1 and 2 operates in the following manner. A conductor 9 of circular cross-section, from which an end part of the insulation is to be stripped, is placed on the support member and its end is pushed toward the front side of base plate 12 until conductor end abuts the front side of the base plate. Accordingly, the portion 12c of the front side of the base plate 12 adjacent to the support member 13 acts as a stop for the conductor 9. The operator with one hand firmly holds the conductor 9 and with the other hand rotates the crank handle 12b in the clockwise direction. As a consequence, the sensor pin 16a, initially located in the radially outer circular groove 17a passes into the connecting groove 17c, as shown in FIG. 1, and gradually, depending on the selected steepness or slope of groove 17c, which may extend over several turns, is transferred to the inner circular groove 17b. Support member 13 rotates along with the base plate 12 around the conductor 9 which is constantly pressed onto the support member by the insulation cutting knife 18. Sleeve 16 moves along the arm 15 for an extent equal to the difference between the radii of the two circular grooves 17a, 17b, and the knife edge 18a of the insulation cutting knife 18 gradually penetrates into the insulation layer 9a of the conductor at a rate determined by the slope or steepness of the groove 17c and a severing cut is produced along the full circumferential periphery of the insulating layer. Accordingly, a non-operative outer position of the insulation cutting knife 18 is defined by the outer circular groove 17a and an end-of-cut inner position of the knife is defined by the inner circular groove 17b after the sensor pin 16a has passed through the connecting groove 17c between the two circular grooves. Between the two extreme positions there is a contact position of the insulation cutting knife, shown in FIG. 1, in which the knife edge portion 18a just touches the radially outer surface of the insulation layer 9a.

It is advisable to carry out at least one more full turn of the rotor member 12 after the end-of-cut position has been reached, to assure that the severing cut has achieved the intended full final depth around the conductor. When the insulation cutting knife 18 approaches the end-of-cut position very gradually, that is, when the connecting groove 17c extends over several turns, the difference in depth between the beginning and end of the last "approaching" turn of the knife edge may be so small that no further turn is needed.

At the end of the cutting operation, the crank handle 12b can be rotated in the opposite direction to transfer the sensor pin 16a back into the radially outer circular groove 17a. A second connecting groove 17c' sloping in the opposite direction to the connecting grooves 17c, may be provided for transferring the sensor pin from the radially inner to the radially outer circular groove.

Figure 3:
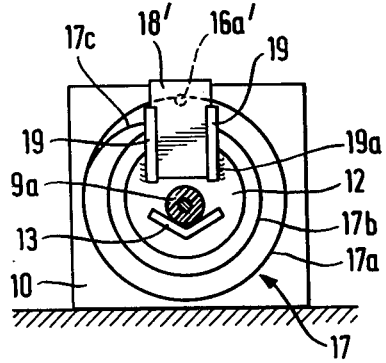
FIG. 3 is a front view, similar to FIG. 1, of a second embodiment of the apparatus incorporating the present invention.

In another embodiment shown in FIG. 3, an insulation cutting knife 18' is slidably arranged in a generally radially extending dovetail guide 19 which forms a knife mounting means located at the axial distance A from the front side of the base plate 12. The guide 19 is fixed to the base plate 12 such as by the weldments 19a. The sensor pin 16a' engages in the groove system 17 and is anchored directly to the knife 18' and thus has a length similar to that described for the sensor pin in the first embodiment. The mode of driving and operating the apparatus is the same as described in connection with FIGS. 1 and 2.

The apparatus illustrated is FIGS. 4 through 7 has a circular base plate 12 in which a driving shaft 12d is such that the base plate can be rotated relative to the upright stand 10. As viewed in FIG. 5, the base plate 12 has a front or left side and a right or rear side with the shaft 12d extending axially outwardly from the rear side. The drive for the base plate is defined by a pulley 12b' mounted on the end of the driving shaft 12b spaced from the base plate and the pulley is driven by an electric motor M by means of a rubber belt. Support member 13' for the conductor 9 to be stripped is made up of three axially elongated rollers 13a, 13b, 13c each having a corresponding shaft 13a', 13b', 13b' extending axially outwardly from the front side of the base plate 12. Accordingly, the rollers 13a, 13b, 13c are rotatably mounted on the base plate.

The support member 13' is located adjacent the axis of the base plate 12 so that it affords the concentric location of the conductor relative to the axis of the base plate in the same general manner as the support member 13 in FIGS. 1, 2 and 3.

Figure 7:
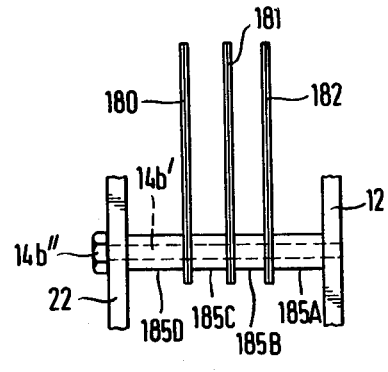
FIG. 7 is a plan view of a pivot tap used in the apparatus shown in FIG. 4, 5 and 6.

On the base plate 12 and spaced outwardly from the support member 13a, a pivot tap 14b' is secured on which three insulation cutters defined by knives 180, 181, 182 are pivotally supported at selected spacings A, B, C from a reference plane 0. This spaced arrangement may be attained if the pivot tap 14b' is provided with a screw thread with securing nuts screwed on to it or, as shown in FIG. 7, by the use of tubular spacer members 185A, 185B, 185C, 185D, with each spacer member having the desired length and each being slipped onto the pivot tap 14b' between the base plate 12 and the knives. Accordingly, pivot tap 14b' forms a knife mounting means. Each of the insulation cutting knives is constantly biased into a non-operative rest position by an extension spring 184.

Each knife has an operative portion, such as the knife edge 180a located on the knife 180 in the region of the support member 13'. Preferably, each knife can be provided with a spare cutting edge 180' located along the opposite side of the knife from the operative cutting edge 180a. The spare cutting edge can be brought into the operative position by turning the knife through 180° around its longitudinal axis.

Spaced axially outwardly from the base plate 12 is a front plate 22 which has the same circular shape and diameter as the base plate. With the aid of spacer means such as bolts 21a, 21b the front plate 22 is concentrically fixed to the base plate 12 at a predetermined axial spacing. Shafts 13a', 13b', 13c' secured each at one end to the base plate, are mounted at the other ends thereof to the front plate 22. One of the spacer means, bolt 21a, holds the extension springs 184, and the pivot tap 14b' acts as a third spacer and is, along with the other two spacers or bolts 21a, 21b threaded at its end part, provided with a retaining nut and secured at said end part in engagement with the front plate 22 so that the spaced position of the front plate 22 from the base plate 12 can be maintained by means of said nuts having screw heads 14b", 21a' and 21b'. A central opening 22a through the front plate 22 affords admission to the support member 13' located between the front plate and the base plate.

A circular barrel shell or hollow cylindrical body 23 encircles the axis between the base plate 12 and the front plate 22. To provide free rotation of the body 23 relative to the front plate and the base plate, its radically inner diameter is somewhat smaller than the outer diameter of the base plate and front plate so that the body 23 is retained between these plates when the nuts 14b", 21a' and 21b' are secured.

For each of the insulation cutting knives 180, 181, 182 there is an elongated slot 23a', formed through the wall of the cylindrical body 23. A curved cursor or slide 24 cooperates with each of the slots 23a'. Each slide is provided with an elongated slot 24a extending in the circumferential direction of the body 23 and a fixation screw 24b extends through this slot. Screw 24b has a head 24b' and it is screwed into a threaded hole 23d in the wall of the cylindrical body 23. The screw heads 24b' have a larger dimension than the width of the slots 24a and are readily accessible from the outside of the apparatus. At least along a part of the outer surface of the wall of the cylindrical body there are circumferentially extending guide crests or collars 23b for guiding movement of the slides 24 and each collar contacts one side edge or circumferentially extending edge of at least one slide 24. Slides 24 form knife actuating means and cylindrical body 23 defines carrier means for the actuating means.

At the opposite end of each cutting knife from the pivot tap 14b' it has a free end 180b which projects through the slot 23a' and upon rotation of the cylindrical body 23 relative to the base plate 12 comes into contact with a terminal edge 24c of the corresponding slide 24. The projecting free end 180b defines an engagement means for the actuating means.

Figures 4, 5:
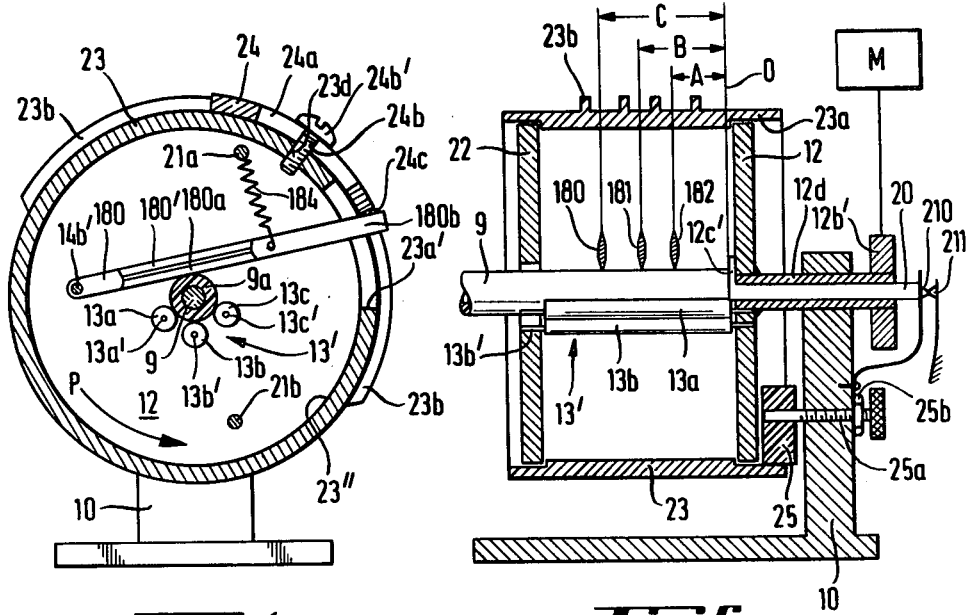
FIG. 4 is a cross-sectional view on a larger scale than in the above figures of a third embodiment of the present invention.
FIG. 5 is a longitudinal sectional view of the apparatus displayed in FIG. 4.
Figure 6:
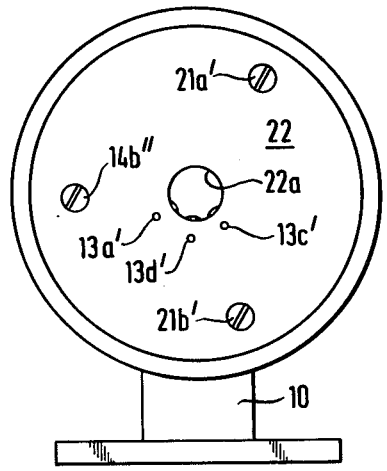
FIG. 6 is a front end view of the apparatus illustrated in FIGS. 4 and 5.

As can be seen in FIG. 5, the hollow cylindrical body 23 extends axially beyond the base plate 12 and forms a brake rim 23a for a brake block 25. Brake block 25, which may be formed of rubber, defines a brake body located eccentrically on and fixed by a set screw 25a screwed into a threaded hole in stand 10. Further, the set screw 25a has a check nut 25b. Brake pressure is regulated by turning set screw 25a into an appropriate position and securing check nut 25b. Parts 23a, 25, 25a, 25b define an adjustable brake mechanism.

The apparatus illustrated in FIGS. 4, 5, 6 and 7 operates in the following manner. The desired distances A, B, C are set after the front plate 22 has been removed. With the desired distance set, front plate 22 is placed back on the apparatus and the cutting depths, desired for the series of conductors to be stripped, are set by moving the slides, after the screws 24b have been loosened, into appropriate position, whereupon the screws are again tightened. The first conductor of the series is inserted through the opening 23a onto the support member 13' until the leading end of the conductor abuts against a stop member. As shown in FIG. 5, the stop member is formed by a stop plate 12c' arranged on a rod 20. The shaft 12d which carries the base plate 12 is hollow and a rod 20 passed through it and projects from the rear end of the shaft 12d.

When an inserted conductor 9 abuts against the stop plate 12c' it axially displaces the rod 20. When the rod is displaced it closes a pair of resilient electrical contacts 210, 211 located at the end of the rod 20 outwardly from the base plate 12 and the stand 10. The pair of contacts 210, 211 may control a relay not shown, by which the motor M driving the pulley 12b' can be started and stopped. The front face of the stop plate 12c', facing to the left in FIG. 5, defines the reference plane 0 from which the distances A, B, C, are measured.

When motor M is started, the base plate 12 and front plate 22 start to rotate in the direction of arrow P and the free ends 180b of the knives 180, 181, 182 come into contact with the terminal edges 24c of the slides 24 defining the control means. The force of the tension springs 184 is overcome and the operative knife edge portions 180a are brought into contact with the outer periphery of the insulation layer 9a, that is, the contact position of the insulation cutting knives is attained.

In the absence of the adjustable brake mechanism 23a, 25, 25a, 25b the only effect would be that the hollow cylindrical body 23, driven by the engagement means 180b would begin to rotate at the same rate as the base plate 12 and the front plate 22. The brake mechanism which can be adjusted by set screw 25a, however, decelerates at a selected degree the rotation of the cylindrical body 23 and retards its rotation relative to the base plate 12 and the front plate 22 with the consequence that the insulation cutting knives 180, 181, 182 at a selective rate penetrate into insulation layer 9a until they reach a predetermined depth. When the predetermined depth has been attained, the cylindrical body 23 then rotates at the same rate with the plates 12, 22 and the knives do not change their depth or end-of-cut position, and as mentioned above, at least one further full turn of the hollow body can be effected after the end-of-cut position has been reached.

It will be remembered that the depth of penetration has been set individually for each knife with the aid of the corresponding slide 24. By regulating the brake pressure, the speed of penetration or cutting of the knives, that is the movement from the contact position inwardly into the end-of-cut position, is regulated independently of the setting of the depth of the cut. When the end-of-cut position has been reached, the conductor may be, as stated above, kept in the apparatus for at least one additional full turn to assure that each incision or cut has reached the desired depth around its full circumferential extent. Then the conductor is removed from the apparatus with the resilient contact 210 rebounding more than the resilient contact 211 so that the rod 20 is displaced with the stop plate 12c' back into the initial position and at the same time, the electrical connection between the two contacts is interrupted and the motor M is stopped.

The shaft 12d may operate, for instance, at four revolutions per second and the stripping operation on a conductor with a diameter of 8 mm takes about 5 seconds.

Figure 8:
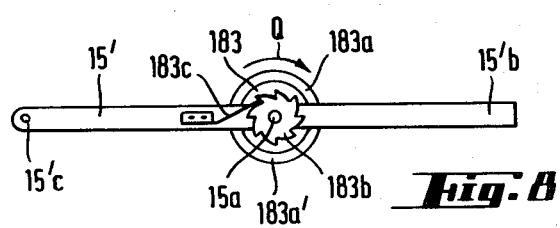
FIG. 8 is a side view of an alternative embodiment of an insulation cutting knife for use in the embodiments of FIGS. 1 and 2 or FIGS. 4 through 7.

In FIG. 8 a preferred alternative embodiment of an insulation cutting means for the apparatus disclosed in FIGS. 4 through 7 is illustrated on an enlarged scale. The insulation cutting means includes an elongated knife holder 15' supporting a knife in the form of a circular disc 183 having a cutting edge 183a around its full circumferential periphery. Disc 183 is non-rotatably fixed to a tap 15a which is rotatably mounted on an arm defining the knife holder 15' and the arm is pivotally fixed at 15'c to the pivot tap 14b' of FIG. 4. The opposite end 15'b of arm 15' defines an engagement means for the control means 24 of FIG. 4. A ratchet wheel 183b is also non-rotatably mounted on the tap 15a and engages in resilient pawl 183c secured on the arm 15' so that the knife 183 can rotate only in the direction of the arrow Q which is opposite to the direction in which it would be rotated in operation due to friction with the insulation layer. Accordingly, rolling of the disc-shape knife 183 during the cutting operation is prevented and at the same time replacement of a blunt section of the operative cutting knife edge 183a by a sharpened section is afforded, since the knife can be rotated by hand in the desired direction by at least the spacing of one ratchet tooth. The entire cutting edge 183a may be considered to define a plurality of spare cutting edges comparable to the function of the spare edge 180' shown in FIG. 4.

When a cutting operation is completed, conductor 9 should be rotated slightly in the direction opposite to the direction of arrow P so that the means 180b or 15'b and 24 disengage whereby the springs 184 can pull the knives out of the severing cuts formed in the insulation layer and return them back to their initial positions.

Figure 9:
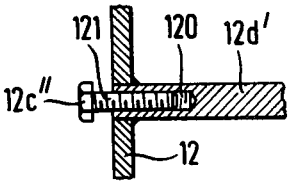
FIG. 9 is an alternatie embodiment of a stop means as used in the embodiment of the apparatus shown in FIGS. 4 through 7.

In FIG. 9 another embodiment of a stop member for the conductor 9 is shown. The shaft 12d' which carries the base plate 12 is massive and is provided with an axial threaded hold 120 in which a set screw 121 with a hexagon head 12c" is screwed in. Screw 121 may be adjusted with the aid of a convenient wrench, inserted through the opening 22a, note FIG. 6, or after the front plate 22 has been removed. The front face of screw head 12c" defines the stop means proper. Motor M in such a case can be controlled by a foot switch.

Figure 10:
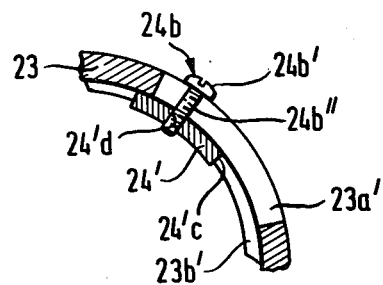
FIG. 10 is an alternate embodiment of the control means used in the embodiment displayed in FIGS. 4 to 7.

Other alternatives are possible within the scope of the invention. For instance, the slides 24' and the rib-like crests or collars 23b' may be provided as in FIG. 10, where they are located on the inner face of the hollow cylindrical body 23. The slides 24' with edges 24'c in this arrangement are provided with threaded holes 24'd instead of the slots 24a and the screws 24b are threaded into these holes 24'd. The shafts 24b" of the screws 24b pass through the slots 23a' in the wall of the cylindrical body 23 and their heads 24b' have a greater dimension than the corresponding dimension of the slots 23a' and are accessible from the outside. It will be recognized that the engagement means 15'b, 180b of FIGS. 4 and 8 may in in this case also terminate at the inner wall face, or project into and possibly extend out of the slots 23a'.

The brake ring 23a may be located at the outer face of the body 23 and it may be affected, with adjustable force, by two brake blocks located adjacent the stand 10 at the 3 o'clock and 9 o'clock positions.

Stop member 12c' of FIG. 5 may be complemented by an adjustable member similar to the member 12c" of FIG. 9.

It will also be readily understood that the presence of front plate 22 is not an absolute necessity, because the shafts 13a', 13b', and 13c' as well as the hollow cylindrical body 23 may be mounted in a cantilever manner on the base plate 12, particularly where the rearward projection of the brake rim 23a may be extended somewhat more in the axial direction.

While specific embodiments of the invention have been shown and described in detail to illustrate the application of the inventive principles, it will be understood that the invention may be embodied otherwise without departing from such principles.

We claim:

1. Apparatus for stripping insulation from electrical conductors having a circular cross-section, comprising a stationary stand, a rotor member including a circular base plate and mounted on said stand for rotation about an axis; means for rotating the rotor member about said axis relative to said stand; a support member mounted on said rotor member for rotation therewith and arranged to support a conductor from which an insulation layer is to be stripped in general alignment with said axis; means for cutting insulation and comprising an operative knife edge portion and engagement means; means arranged on said rotor member for movably mounting said insulation cutting means, means for actuating said mounting means and arranged to engage said engagement means; a carrier for said actuating means, said actuating means affecting via said engaging means and upon rotation of said rotor member said knife edge portion so as to impart it a radial inward movement, wherein said carrier comprises a pair of circular guiding grooves formed in said stand concentrically with the axis of said base plate, one of said circular grooves being spaced radially outwardly from the other circular groove, and a connecting groove extending between and interconnecting the said two circular grooves, said knife mounting means including an arm secured in pivotal relationship to said rotor member, and a sleeve slidably mounted on said arm, said engagement means being attached to said sleeve and extending therefrom into engagement with said actuating means.

2. Apparatus for stripping insulation from electrical conductors having a circular cross-section, comprising a stationary stand; a rotor member including a circular base plate and mounted on said stand for rotation about an axis; means for rotating the rotor member about said axis relative to said stand; a support member mounted on said rotor member for rotation therewith and arranged to support a conductor from which an insulation layer is to be stripped in general alignment with said axis; means for cutting insulation and comprising an operative knife edge portion and engagement means; means arranged on said rotor member for movably mounting said insulation cutting means, means for actuating said mounting means and arranged to engage said engagement means; a carrier for said actuating means, said actuating means affecting via said engaging means and upon rotation of said rotor member said knife edge portion so as to impart it a radial inward movement, wherein said carrier comprises a pair of circular guiding grooves formed in said stand concentrically with the axis of said base plate, one of said circular grooves being spaced radially outwardly from the other circular groove, and a connecting groove extending between and interconnecting the said two circular grooves, said knife mounting means including a radially extending dovetail guide fixed to the base plate and slidably accommodating the insulation cutting means which are provided with a sensor pin engaging said guiding grooves.

3. Apparatus for stripping insulation from electrical conductors having a circular cross-section, comprising a stationary stand; a rotor member including a circular base plate mounted on said stand for rotation about an axis; means for rotating the rotor member about said axis relative to said stand; a support member mounted on said rotor member for rotation therewith and arranged to support a conductor from which an insulation layer is to be stripped in general alignment with said axis; means for cutting insulation and comprising an operative knife edge portion and engagement means; means arranged on said rotor member for movably mounting said insulation cutting means, means for actuating said mounting means and arranged to engage said engagement means; a carrier for said actuating means, said actuating means affecting via said engagement means and upon rotation of said rotor member said knife edge portion so as to impart to it a radial inward movement, said carrier means comprises a hollow cylindrical body concentric with said axis and rotatable independently about this axis relative to said base plate, said body having an inner surface and an outer surface and said actuating means being adjustably mounted on one of the said surfaces, said engagement means are arranged to rotate said body when said base plate is rotated, a braking mechanism being provided to selectively engage with said cylindrical body for slowing down its rotation relative to the rotation of said base plate until said knife edge portion attains a predetermined end-of-cut position, and means being provided for biasing said insulation cutting means to an initial or rest position.

4. Apparatus, as set forth in claim 3, wherein said actuating means are arranged in contact with said carrier for positively holding said knife edge portion in the end-of-cut position for at least one full turn of said rotor member.

5. Apparatus, as set forth in claim 1, wherein said means for movably mounting said insulating means comprises a pivot tap secured to said rotor member and said insulating cutting means is pivotally mounted on said pivot tap with said knife edge portion located at a preselected distance from a reference plane determined by the end position of the conductor supported on said support member.

6. Apparatus, as set forth in claim 3, including a front plate having the same circular shape and diameter as said base plate and being axially spaced from and secured to said base plate, so that the axis of said front plate is aligned with the axis of the base plate, said front plate having a central opening for access to the space between the front and base plates.

7. Apparatus, as set forth in claim 6, wherein the front plate has the same circular shape and diameter as the base plate, said hollow cylindrical body extends axially between the two said plates laterally enclosing the space between them, and means are provided for fixing said front plate to said base plate independently of said hollow cylindrical body.

8. Apparatus, as set forth in claim 3, wherein said brake mechanism comprises at least one adjustable brake block supported on said stand and said hollow cylindrical body forms a brake rim adjacent said base plate, said adjustable brake block being engageable with said brake rim.

9. Apparatus, as set forth in claim 3, wherein said actuating means comprise at least one elongated circumferentially extending slot in said hollow cylindrical body.

10. Apparatus, as set forth in claim 3, wherein said insulation cutting means includes two knife edge portions of which either may define the operative knife edge portion.

11. Apparatus, as set forth in claim 3, wherein said insulation cutting means comprises an elongated knife holder provided with said engagement means, and a circular, disc-shaped knife, rotatably supported on said elongated knife holder and having a knife edge extending along its entire periphery.

12. Apparatus, as set forth in claim 11, wherein a ratchet-wheel-and-pawl assembly is is mounted on said knife holder and secured to said disc-shaped knife for controlling the rotational position of said knife relative to said knife holder.

13. Apparatus, as set forth in claim 3, including adjustable stop means adjacent said base plate for defining the axial position of the conductor on said support member.

14. Apparatus, as set forth in claim 3, wherein said support member comprises a plurality of elongated rollers secured to and extending outwardly from said base plate generally parallel with the axis of the base plate.

15. Apparatus, as set forth in claim 3, wherein said means for rotating said rotor member comprises a motor, a shaft secured to said base plate and extending axially outwardly therefrom, a pulley mounted on said shaft spaced axially from said base plate, and a belt trained around said pulley and driven by said motor for rotating said base plate.

16. Apparatus, as set forth in claim 15, wherein said shaft is hollow, an axially displaceable rod extending therethrough and having at a first end adjacent the surface of said base plate a stop member and adjacent an opposite second end of the rod, a pair of electrical contact means arranged so that when a conductor is placed on said support member and pushed on said stop said rod is displaceable for establishing electrical contact in said contact pair which is arranged to start said motor.

17. Apparatus, as set forth in claim 3, wherein said insulation cutting means comprises a plurality of said knife mounting means each having said operative knife edge portion at a different axial placement from said base plate.

* * * * *